US008423632B2

(12) United States Patent
Yin et al.

(10) Patent No.: US 8,423,632 B2
(45) Date of Patent: Apr. 16, 2013

(54) METHOD, NETWORK MANAGEMENT CENTER, AND A RELATED DEVICE FOR CONFIGURING A NETWORK POLICY FOR A VIRTUAL PORT

(71) Applicant: Huawei Technologies Co., Ltd., Guangdong (CN)

(72) Inventors: Yue Yin, Nanjing (CN); Wei Song, Nanjing (CN); Jin Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/630,607

(22) Filed: Sep. 28, 2012

(65) Prior Publication Data

US 2013/0031235 A1 Jan. 31, 2013

Related U.S. Application Data

(63) Continuation of application No. 13/237,432, filed on Sep. 20, 2011.

(30) Foreign Application Priority Data

Sep. 20, 2010 (CN) .......................... 2010 1 0290742

(51) Int. Cl.
*G06F 15/173* (2006.01)
(52) U.S. Cl.
USPC ........................... 709/223; 709/220; 709/228
(58) Field of Classification Search .......... 709/220–228; 370/252, 389, 392, 429
See application file for complete search history.

(56) References Cited

U.S. PATENT DOCUMENTS

| 5,327,553 | A | 7/1994 | Jewett et al. | |
|---|---|---|---|---|
| 6,085,238 | A * | 7/2000 | Yuasa et al. | 709/223 |
| 6,807,172 | B1 * | 10/2004 | Levenson et al. | 370/389 |
| 7,365,516 | B2 | 4/2008 | Leyten et al. | |
| 7,646,735 | B1 | 1/2010 | Naumann | |
| 7,962,647 | B2 * | 6/2011 | Suri et al. | 709/238 |

(Continued)

FOREIGN PATENT DOCUMENTS

| CN | 101299718 A | 11/2008 |
|---|---|---|
| CN | 101820392 A | 9/2010 |
| WO | 2008103936 A1 | 8/2008 |
| WO | 2009146165 A1 | 12/2009 |

OTHER PUBLICATIONS

Office action issued in corresponding EP application No. 11181954.6, Dec. 13, 2012, total 8 pages.
Cisco Systems, "Cisco VN-Link: Virtualization-Aware Networking," XP-002593596, 2009, total 11 pages.

(Continued)

*Primary Examiner* — Phuoc Nguyen

(57) ABSTRACT

A method, a network management center, and a related device. The method includes: obtaining a physical network policy group and a media access control (MAC) address of a virtual port; associating the physical network policy group and the MAC address of the virtual port to form a virtual port policy association table; and selecting the physical network policy group corresponding to the MAC address carried by a request from the virtual port policy association table, and delivering the physical network policy group to a physical switch sending the request. When a virtual machine (VM) on the server is migrated, the method may be used to migrate the network policy for the virtual port on a real-time basis. Therefore, the real-time effect of services provided by the VM is improved in the virtualization process of the server.

22 Claims, 10 Drawing Sheets

U.S. PATENT DOCUMENTS

| | | | |
|---|---|---|---|
| 8,194,668 B2* | 6/2012 | Friskney et al. | 370/392 |
| 8,239,929 B2* | 8/2012 | Kwan et al. | 726/11 |
| 8,289,967 B2* | 10/2012 | Ma | 370/392 |
| 2004/0099065 A1 | 5/2004 | Deconde et al. | |
| 2005/0212495 A1 | 9/2005 | Leyten et al. | |
| 2006/0053461 A1 | 3/2006 | Jacobson | |
| 2008/0108338 A1 | 5/2008 | Herrero Veron et al. | |
| 2009/0083445 A1 | 3/2009 | Ganga | |
| 2010/0054260 A1 | 3/2010 | Pandey | |
| 2010/0278180 A1* | 11/2010 | Ma | 370/392 |
| 2011/0274110 A1* | 11/2011 | Mmmadi et al. | 370/392 |
| 2011/0299534 A1* | 12/2011 | Koganti et al. | 370/392 |

OTHER PUBLICATIONS

Office action issued in corresponding to Chinese application No. 201010290742.4, dated Oct. 10, 2012, and an English translation thereof, total 15 pages.

Paul Bottroff, Vivek Kashyap, etc: "Edge Virtual Bridge Proposal Version 0, Rev 0.1; Hewlett-Packard Corp., IBM, HP, etc.", Apr. 23, 2010. 72 pages total.

Search report issued in corresponding European patent application No. EP11181954.6, dated May 3, 2012, total 10 pages.

* cited by examiner

METHOD, NETWORK MANAGEMENT CENTER, AND A RELATED DEVICE FOR CONFIGURING A NETWORK POLICY FOR A VIRTUAL PORT

CROSS-REFERENCE TO RELATED APPLICATION

This application is a continuation of U.S. application Ser. No. 13/237,432, filed on Sep. 20, 2011, which claims priority to Chinese Patent Application No. 201010290742.4, filed on Sep. 20, 2010, both of which are hereby incorporated by reference in their entireties.

FIELD OF THE INVENTION

The present invention relates to the communications field, and in particular, to a method, a network management center, and a related device for configuring a network policy for a virtual port.

BACKGROUND OF THE INVENTION

A virtual machine (VM) is a software-simulated complete computer system that has complete hardware system functions and runs in a completely isolated environment. By using VM software, a user may simulate one or multiple virtual computers on a physical computer. These virtual computers work like real computers. For example, the user may install an operating system and applications and access network resources on these virtual computers. For the user, the VM is only an application executed on the physical computer. However, for the applications executed on the VM, the VM is like a real computer.

With the increase of server utilization, the investment costs of enterprise servers are required to be lower. Therefore, a technology called server virtualization is developed. Server virtualization means abstracting physical resources of servers as logical resources and changing one server into multiple mutually isolated virtual servers or changing multiple servers into one server. Server virtualization may break the physical limit of resources and change the CPU, memory, magnetic disk, and I/O hardware into a resource pool that can be dynamically managed. The core idea of server virtualization is to simplify management and improve efficiency by prioritizing resources and allocating the resources of servers to loads that need the resources most at any time and at any place, so as to reduce resources reserved for a single load peak.

With the emergence of the VM, especially the server virtualization technology, a running entire VM can be migrated immediately from one server to another server by using the complete virtualization of the server, storage, and network connection. This is known as real-time migration of a VM.

After a server is virtualized, the same physical port of a switch may carry traffic of multiple or even dozens of VMs. However, the switch needs to configure different network policies for different VMs. On the other hand, with the real-time migration of the VM on the server, the network policy on the switch also needs to be migrated.

In the prior art, to configure and migrate a network policy on the switch, a network administrator performs manual configuration on the switch through the management center. The manual configuration features huge workload and poor punctuality, and affects real-time service performance of the VM.

SUMMARY OF THE INVENTION

Embodiments of the present invention provide a method, a network management center, and a related device for configuring a network policy for a virtual port to improve the efficiency of network policy configuration and the real-time effect of services provided by a VM.

An embodiment of the present invention provides a method for configuring a network policy for a virtual port. The method includes: obtaining a virtual network policy group, a physical network policy group, and a media access control (MAC) address of a virtual port, where the virtual network policy group is used by a virtual switch to configure the network policy for the virtual port after being delivered to the virtual switch; associating the virtual network policy group, the physical network policy group, and the MAC address of the virtual port to form a virtual port policy association table; and selecting a physical network policy group corresponding to the MAC address from the virtual port policy association table, and delivering the physical network policy group to a physical switch, so that the physical switch configures the network policy for the virtual port corresponding to the MAC address.

An embodiment of the present invention provides a method for configuring a network policy for a virtual port. The method includes: obtaining a MAC address of a virtual port; sending a request that carries the MAC address, where the request is used to request delivering a physical network policy group that is used for configuring the network policy for the virtual port corresponding to the MAC address; and receiving the delivered physical network policy group, and configuring the network policy for the virtual port corresponding to the MAC address.

An embodiment of the present invention provides a network management center. The network management center includes: an obtaining module, configured to obtain a virtual network policy group, a physical network policy group, and a MAC address of a virtual port, where the virtual network policy group is used by a virtual switch to configure a network policy for the virtual port after being delivered to the virtual switch; an associating module, configured to associate the virtual network policy group, the physical network policy group, and the MAC address of the virtual port of a VM to form a virtual port policy association table; and a policy delivering module, configured to select a physical network policy group corresponding to the MAC address from the virtual port policy association table, and deliver the physical network policy group to a physical switch, so that the physical switch configures the network policy for the virtual port corresponding to the MAC address.

An embodiment of the present invention provides a physical switch. The physical switch includes: an obtaining module, configured to obtain a MAC address of a virtual port; a request sending module, configured to send a request that carries the MAC address, where the request is used to request delivering a physical network policy group that is used for configuring a network policy for the virtual port corresponding to the MAC address; and a policy receiving module, configured to receive the delivered physical network policy group, and configure the network policy for the virtual port corresponding to the MAC address.

An embodiment of the present invention provides a communication system. The communication system includes a server and a physical switch. The server is configured to create a VM, and send packets to the physical switch, where the packets carry a MAC address of a virtual port of the VM. The physical switch is configured to: obtain the MAC address of the virtual port from the packets sent by the server, send a request that carries the MAC address, receive a virtual network policy group and a physical network policy group, and configure a network policy for the virtual port corresponding to the MAC address. The request is used to request delivering the virtual network policy group and the physical network policy group that are used for configuring the network policy for the virtual port corresponding to the MAC address.

According to embodiments of the present invention, the network management center may associate the virtual network policy group, the physical network policy group, and the MAC address of the virtual port of the VM; after receiving a network policy request from the physical switch, the network management center selects a physical network policy group corresponding to the MAC address from the virtual port policy association table, and delivers the physical network policy group to the physical switch; the physical switch configures the network policy for the virtual port corresponding to the MAC address. Because the physical switch does not require manual operations when obtaining the network policy, the efficiency of network policy configuration is improved and policy configuration is usually correct. When the VM on the server is migrated, the method for configuring the network policy for a virtual port in this embodiment may be used to migrate the network policy for the virtual port on a real-time basis. Therefore, the real-time effect of services provided by the VM is improved in the virtualization process of the server.

BRIEF DESCRIPTION OF THE DRAWINGS

To make the technical solutions of the present invention clearer, the accompanying drawings for illustrating the embodiments of the present invention are described below. Evidently, the accompanying drawings are exemplary only, and those skilled in the art can derive other drawings from such accompanying drawings without creative efforts.

DETAILED DESCRIPTION OF THE EMBODIMENTS

The technical solutions of the present invention are detailed below with reference to the embodiments and accompanying drawings. Apparently, the embodiments described below are exemplary only and not exhaustive. Those skilled in the art can derive other embodiments from the embodiments given herein without making any creative effort, and all such embodiments are covered in the protection scope of the present invention.

Figure 1:
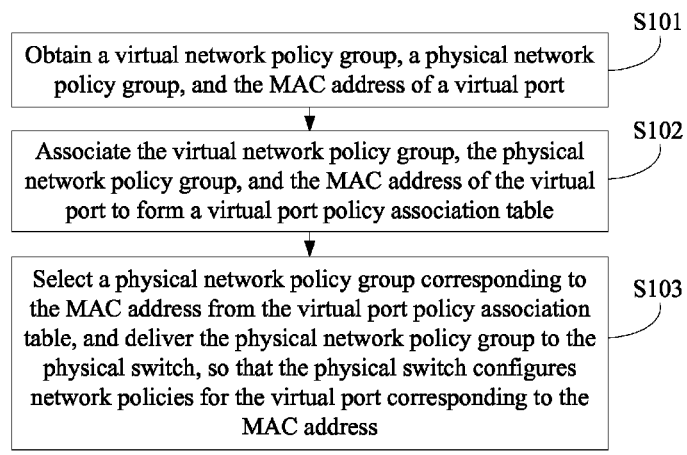
FIG. 1 is a schematic flowchart of a method for configuring a network policy for a virtual port according to an embodiment of the present invention.

FIG. 1 is a schematic flowchart of a method for configuring a network policy for a virtual port according to an embodiment of the present invention. The method may be executed by a network management center. The method includes the following steps:

S101. Obtain a virtual network policy group, a physical network policy group, and the MAC address of a virtual port.

The virtual port is an interface between a virtual switch and a VM on a server for connecting the virtual switch and the VM. Once a VM is created, at least one virtual port exists. One VM corresponds to at least one virtual port, and one virtual port is uniquely identified by the MAC address of the virtual port. As mentioned earlier, after the server is virtualized, the same physical port (the interface between the physical switch and the virtual switch) of the switch may carry traffic of multiple or even dozens of VMs. This means that packets of multiple virtual ports may flow to the physical switch from the same physical port or the packets may be delivered to multiple virtual ports from the same physical port. In this embodiment, the physical switch does not configure the network policy for a physical port, but uses each virtual port as the minimum granularity for the network policy configuration. The physical network policy group refers to a group of network policy configuration information that the physical switch uses for the virtual port, for example, bandwidth limit information and port isolation information. The physical switch may configure the network policy for the virtual port by using such information. Accordingly, the virtual network policy group refers to a group of network policy configuration information that the virtual switch in the server uses for the virtual port, for example, the virtual local area network (VLAN) information and the bandwidth limit information. After the virtual network policy group is delivered to the virtual switch through a server management center, the virtual switch may configure the network policy for the virtual port by using such information.

Specifically, the method for obtaining the physical network policy group may be: the network management center creates a physical network policy group in the local database to form a physical network policy group table as shown in Table 1. In Table 1, the first column refers to physical network policy group numbers, and the other columns refer to specific physical network policy groups. For example, policy group 1 is configured, the bandwidth is limited to 2 M, and the port isolation is enabled. That is, a virtual port is isolated from other virtual ports and cannot communicate with each other. The method for obtaining the virtual network policy group and the MAC address of the virtual port may be: the server management center creates a virtual network policy group in the local database to form a virtual network policy group table as shown in Table 2. Similarly, the first column in Table 2 refers to the virtual network policy group numbers, and the other columns refer to the specific virtual network policy groups. The policy group information includes VLAN information and bandwidth limit information. Specifically, policy group 1 indicates that the bandwidth of VLAN 100 is limited to 2 M. Then, a mapping between the MAC address and the virtual network policy group is established; the mapping and the MAC address are synchronized to the network management center; the network management center receives and obtains the mapping and the MAC address.

TABLE 1

| Physical Network Policy Group Number | Bandwidth Limit | Port Isolation | ... |
|---|---|---|---|
| Policy group 1 | 2 M | Enable | ... |
| Policy group 2 | 10 M | Disable | ... |
| ... | ... | ... | ... |
| Policy group N | 5 M | Disable | ... |

TABLE 2

| Physical Network Policy Group Number | VLAN | Bandwidth Limit | ... |
|---|---|---|---|
| Policy group 1 | 100 | 2 M | ... |
| Policy group 2 | 200 | 10 M | ... |
| ... | ... | ... | ... |
| Policy group N | 5 M | Disable | ... |

In another embodiment, the method for obtaining the virtual network policy group and the physical network policy group may be: the network management center creates a network policy group in the local database to form a network policy table as shown in Table 3. This embodiment is different from the preceding embodiment in that the network policy group in Table 3 includes a virtual network policy group and a physical network policy group. That is, each network policy group includes a virtual network policy group and a physical network policy group.

The virtual network policy group and the physical network policy group are the same as those provided in the preceding embodiments, and are not further described. In this embodiment, the server management center sends the MAC address of the virtual port of the VM to the network management center; the network management center receives and obtains the MAC address of the virtual port of the VM.

S102. Associate the virtual network policy group, the physical network policy group, and the MAC address of the virtual port to form a virtual port policy association table.

TABLE 3

| Physical Network Policy Group Number | VLAN | Bandwidth Limit | Port Isolation | DHCP Snooping | ... |
|---|---|---|---|---|---|
| Policy group 1 | 100 | 2 M | Enable | Enable | ... |
| Policy group 2 | 200 | 10 M | Disable | Enable | ... |
| ... | ... | ... | ... | ... | ... |
| Policy group N | 50 | 5 M | Disable | Disable | ... |

In this embodiment, after the virtual network policy group, the physical network policy group, and the MAC address of the virtual port are associated to form a virtual port policy association table, the virtual network policy group and the physical network policy group that uniquely correspond to the MAC address may be found by using the MAC address as the index.

The form of the virtual port policy association table may vary with the method for obtaining the virtual network policy group and the physical network policy group. For example, if the physical network policy group table and the virtual network policy group table as shown in Table 1 and Table 2 are obtained, the virtual port policy association table may be as shown in Table 4. If the network policy group table as shown in Table 3 is obtained, the virtual port policy association table may be as shown in Table 5.

TABLE 4

| VM MAC Address | Physical Network Policy Group Number | Virtual Network Policy Group Number |
|---|---|---|
| MAC A | Policy group 1 | Policy group 2 |
| MAC B | Policy group 2 | Policy group 5 |
| ... | ... | ... |
| MAC X | Policy group 4 | Policy group 6 |

TABLE 5

| VM MAC Address | Network Policy Group Number |
|---|---|
| MAC A | Policy group 1 |
| MAC B | Policy group 2 |
| ... | ... |
| MAC X | Policy group 4 |

It should be noted that Table 1 to Table 5 are only examples of the physical network policy group table, the virtual network policy group table, and the virtual port policy association table that are provided in embodiments of the present invention. It is understandable to those skilled in the art that the forms of the tables shall not be construed as limitations on the present invention. In principle, if the tables of the virtual network policy group and the physical network policy group that uniquely correspond to the MAC address of the virtual port can be searched by using the MAC address as the index, those tables may be used as a virtual port policy association table.

S103. Select a physical network policy group corresponding to the MAC address from the virtual port policy association table, and deliver the physical network policy group to the physical switch, so that the physical switch configures the network policy for the virtual port corresponding to the MAC address.

Specifically, in this embodiment, when the physical switch sends a request for obtaining the network policy (including the virtual network policy group and the physical network policy group), the request may carry the MAC address of a virtual port. The network management center receives the request carrying the MAC address from the physical switch, and searches the virtual port policy association table by using the MAC address as the index. For example, the network management center searches the virtual port policy association table as shown in Table 4, and delivers the found physical network policy group corresponding to the MAC address to the physical switch.

In another embodiment, when the physical network policy group corresponding to the MAC address is selected from the virtual port policy association table and delivered to the physical switch, a virtual network policy group corresponding to the MAC address may also be selected from the virtual port policy association table and delivered to the physical switch. For example, the network management center receives the request carrying the MAC address from the physical switch, and searches the virtual port policy association table by using the MAC address as the index. For example, the network management center searches the virtual port policy association table as shown in Table 4, and delivers the found physical network policy group and virtual network policy group corresponding to the MAC address to the physical switch. Certainly, the network management center may search the virtual port policy association table as shown in Table 5 by using the MAC address as the index, and deliver the found network policy group (including the physical network policy group and the virtual network policy group) corresponding to the MAC address to the physical switch. Although the virtual network policy group is a group of network policy configuration information that the virtual switch on the server uses for the virtual port, the physical switch may also require relevant configuration. For example, in the virtual network policy group, a VLAN is configured for a virtual port. In this case, the VLAN also needs to be configured for a virtual port on the physical switch. The physical switch may obtain the VLAN information from the server or from the network management center. When the physical switch obtains the VLAN information from the network management center, the network management center selects the VLAN information corresponding to the MAC address from the virtual port policy association table, and delivers the VLAN information to the physical switch. In the case that the physical switch needs other information in the virtual network policy group, the network management center may also select other virtual network policy group information corresponding to the MAC address from the virtual port policy association table, and deliver the other virtual network policy group information to the physical switch.

When the network management center delivers the network policy to the physical switch, the network policy may carry the MAC address of the virtual port of the VM.

According to embodiments of the present invention, the network management center may associate the virtual network policy group, the physical network policy group, and the MAC address of the virtual port of the VM; after receiving a network policy request from the physical switch, the network management center selects a physical network policy group corresponding to the MAC address from the virtual port policy association table, and delivers the physical network policy group to the physical switch; the physical switch configures the network policy for the virtual port corresponding to the MAC address. Because the physical switch does not require manual operations when obtaining the network policy, the efficiency of network policy configuration is improved and policy configuration is usually correct. When the VM on the server is migrated, the method for configuring the network policy for a virtual port in this embodiment may be used to migrate the network policy for the virtual port on a real-time basis. Therefore, the real-time effect of services provided by the VM is improved in the virtualization process of the server.

Figure 2:
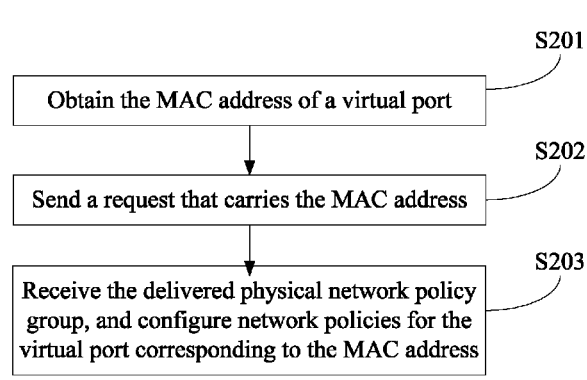
FIG. 2 is a schematic flowchart of a method for configuring a network policy for a virtual port according to another embodiment of the present invention.

FIG. 2 is a schematic flowchart of a method for configuring a network policy for a virtual port according to another embodiment of the present invention. In this embodiment, the method may be executed by a physical switch. The method includes the following steps:

S201. Obtain the MAC address of a virtual port.

In this embodiment, the physical switch receives packets from the server, for example, Address Resolution Protocol (ARP) packets or Dynamic Host Configuration Protocol (DHCP) packets, and learns the MAC address of the virtual port of the VM.

S202. Send a request that carries the MAC address.

The request is used to request the network management center to deliver a physical network policy group that is used for configuring the network policy for the virtual port corresponding to the MAC address. The request carries the MAC address of the virtual port.

The request is further used to request delivering a virtual network policy group that is used for configuring the network policy for the virtual port corresponding to the MAC address.

S203. Receive the physical network policy group, and configure the network policy for the virtual port corresponding to the MAC address.

When the request is further used to request delivering the virtual network policy group that is used for configuring the network policy for the virtual port corresponding to the MAC address, the delivered virtual network policy group may be received to configure the network policy for the virtual port corresponding to the MAC address.

When the network management center delivers the physical network policy group to the physical switch, the physical network policy group may carry the MAC address of the virtual port of the VM. The physical switch configures the network policy for the virtual port corresponding to the MAC address.

In the preceding embodiment, the physical switch automatically learns the MAC address of the virtual port of the VM, obtains the virtual network policy group and physical network policy group, and configures the network policy for the virtual port. This process requires no manual operation, therefore featuring high efficiency and correct configuration.

Figure 3A:
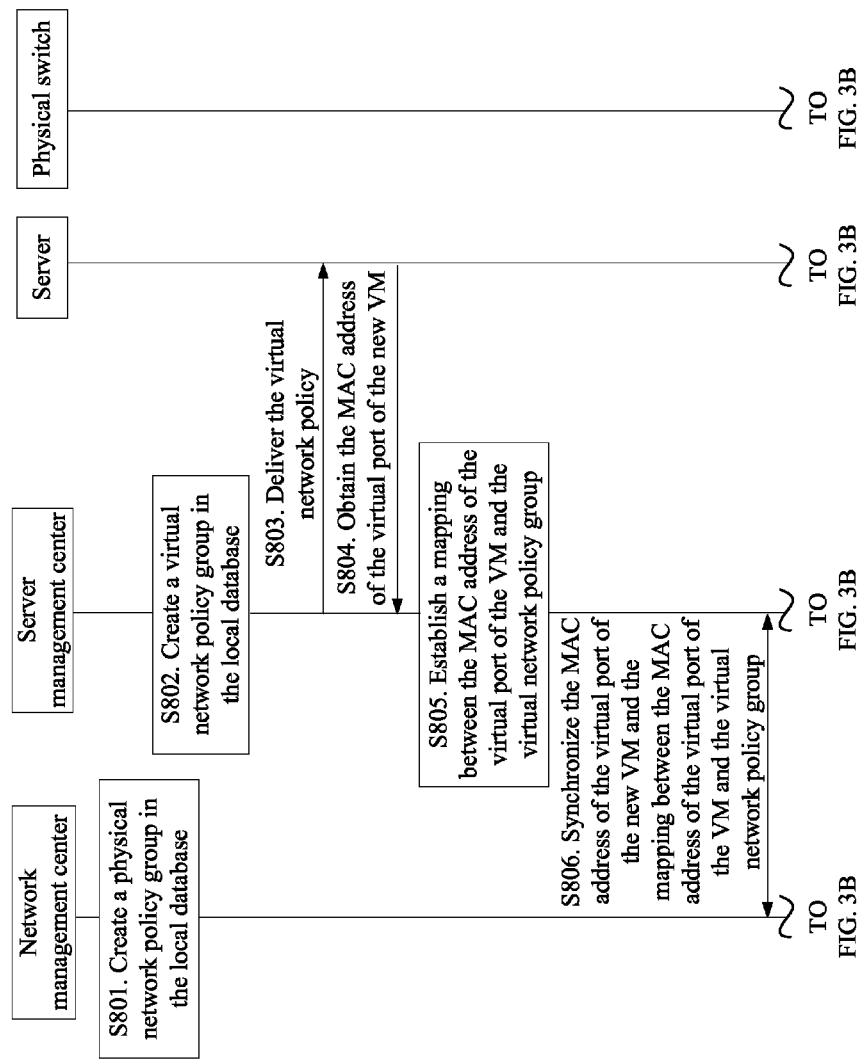
FIG. 3A and FIG. 3B are a schematic flowchart of interaction between a server management center, a server, a physical switch, and a network management center in the method for configuring a network policy for a virtual port according to an embodiment of the present invention.
Figure 3B:
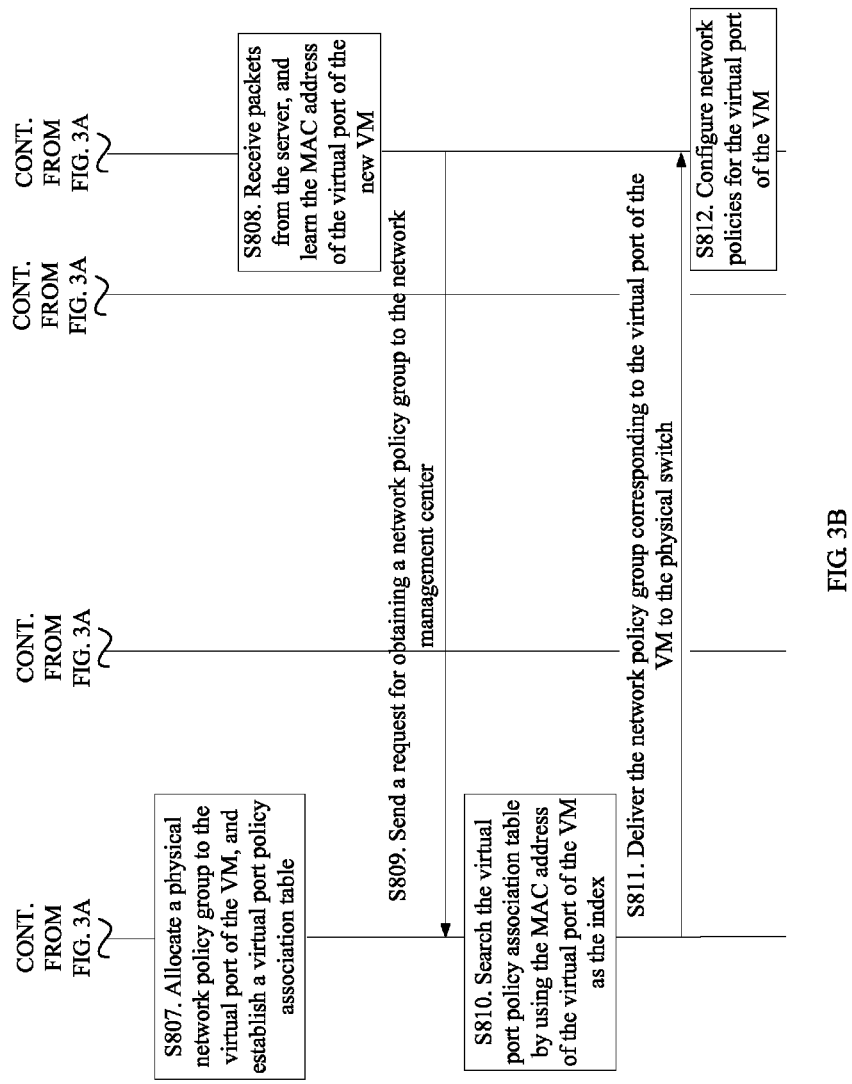

FIG. 3A and FIG. 3B are a schematic flowchart of interaction between a server management center, a server, a physical switch, and a network management center. The following describes the method for configuring a network policy for a virtual port according to an embodiment of the present invention with reference to FIG. 3A and FIG. 3B. The process includes the following steps:

S801. The network management center creates a physical network policy group in the local database.

The created physical network policy group forms a physical network policy group table as shown in Table 1.

S802. The network management center creates a virtual network policy group in the local database.

The created physical network policy group forms a virtual network policy group table as shown in Table 2.

S803. The server management center selects a policy group (for example, policy group 2) from the virtual network policy group table, and delivers the policy group to the VM on the server.

When the server management center creates a VM on the server (which means at least one virtual port exists), the server management center may deliver the policy group to the virtual switch on the server. After receiving the policy group (for example, policy group 2), the virtual switch may complete the network policy configuration for the virtual port of the VM.

Certainly, the server management center may send a command and create a VM on the server. Then, the server management center selects a policy group from the virtual network policy group table, and delivers the policy group to the virtual switch on the server. This is not limited in the present invention. If the server management center sends a Create VM command first, the VM ID may be used to indicate which VM corresponds to the policy group delivered subsequently. In some cases, for example, in the case that the server management center creates another VM only after completing a VM, the VM ID may be omitted because at most one VM is not configured with the network policy on the server.

S804. The server management center obtains the MAC address of the virtual port of the new VM from the server.

S805. The server management center establishes a mapping between the MAC address of the virtual port of the VM and the virtual network policy group (for example, policy group 2).

S806. The server management center synchronizes the MAC address of the virtual port of the new VM and the mapping between the MAC address of the virtual port of the VM and the virtual network policy group to the network management center.

S807. The network management center allocates a physical network policy group (for example, policy group 1) to the virtual port of the VM.

In addition, the network management center establishes a mapping locally by using the MAC address of the virtual port of the VM as the index, and associates the MAC address of the virtual port of the VM, the virtual network policy group of the virtual port of the VM, and the physical network policy group of the virtual port of the VM to form a virtual port policy association table as shown in Table 4.

When allocating a physical network policy group to the virtual port of the VM, the network management center may select a proper physical network policy group according to the virtual network policy group.

S808. The physical switch receives packets (for example, ARP packets or DHCP packets) from the server, and learns the MAC address of the virtual port of the new VM.

S809. The physical switch sends a request for obtaining the network policy group (including the physical network policy group and the virtual network policy group) to the network management center.

The request sent by the physical switch carries the MAC address of the virtual port of the new VM.

S810. The network management center searches the virtual port policy association table by using the MAC address of the virtual port of the VM as the index.

S811. The network management center delivers the found network policy (including the physical network policy group and the virtual network policy group) corresponding to the virtual port of the VM to the physical switch.

S812. After obtaining the physical network policy group and the virtual network policy group, the physical switch completes the network policy configuration for the virtual port of the VM.

When the network management center delivers the physical network policy group to the physical switch, the physical network policy group may carry the MAC address of the virtual port of the VM. The physical switch configures the network policy for the virtual port corresponding to the MAC address.

Figure 4A:
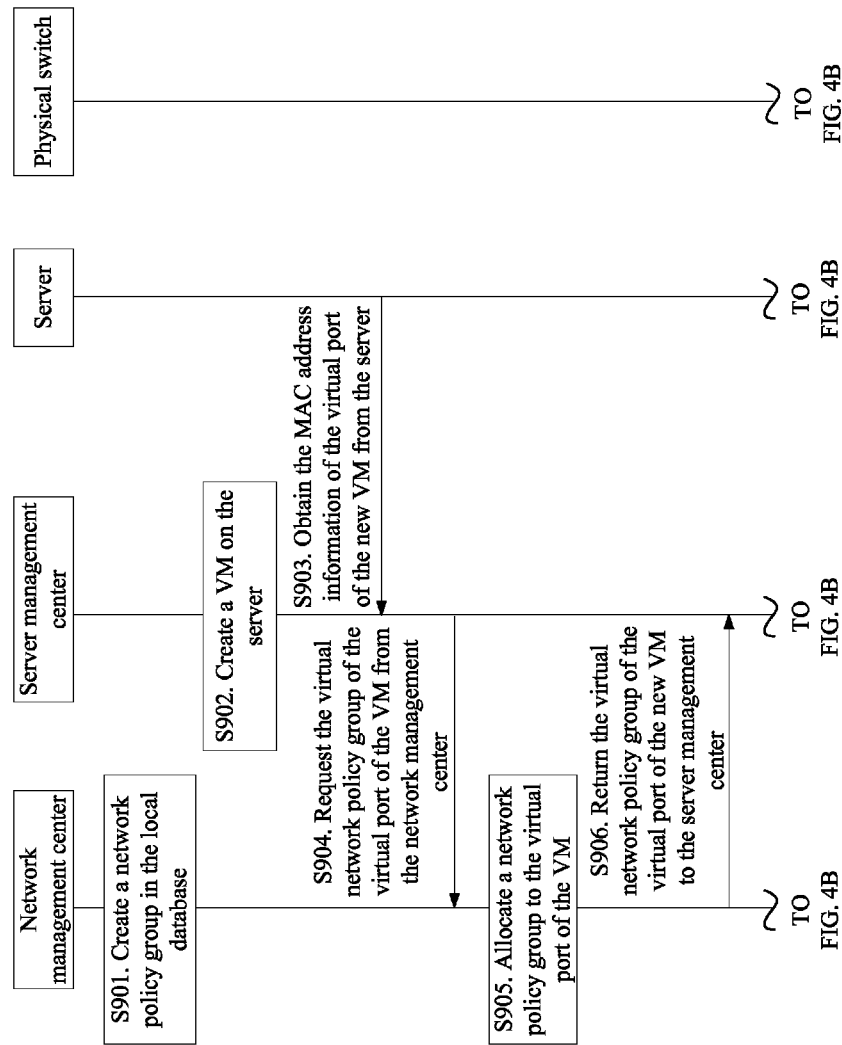
FIG. 4A and FIG. 4B are a schematic flowchart of interaction between a server management center, a server, a physical switch, and a network management center in the method for configuring a network policy for a virtual port according to another embodiment of the present invention.
Figure 4B:
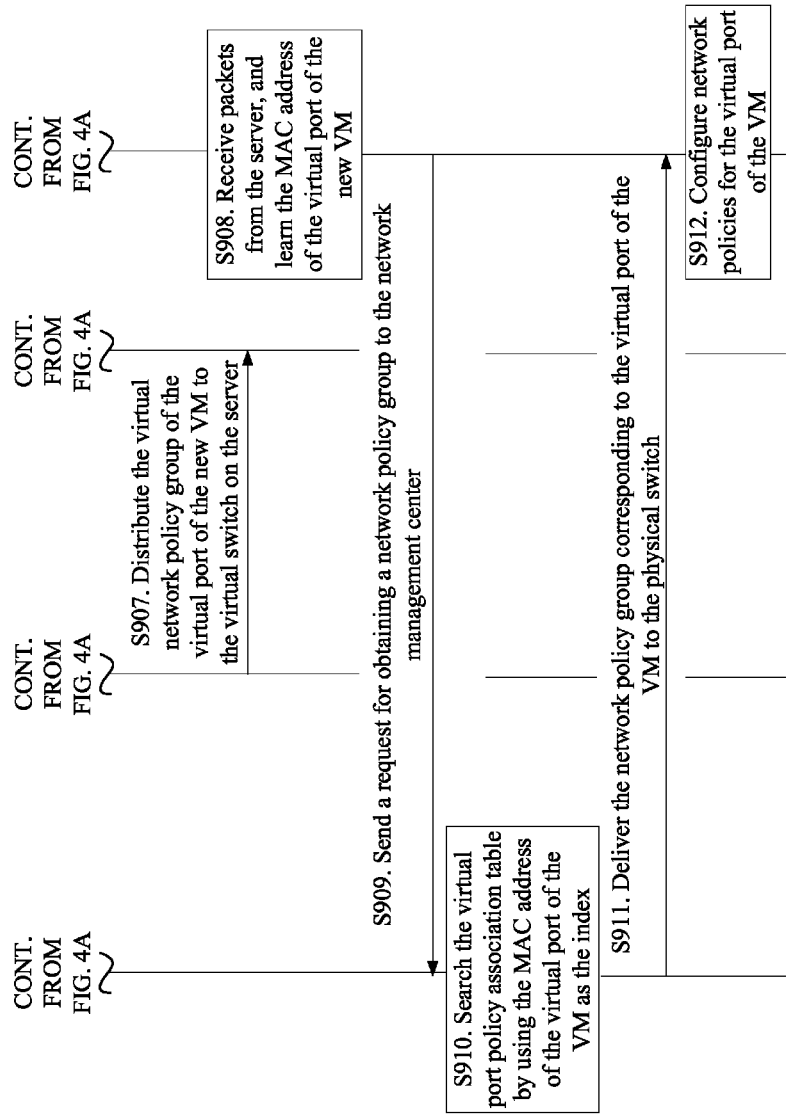

FIG. 4A and FIG. 4B are a schematic flowchart of interaction between the server management center, the server, the physical switch, and the network management center in the method for configuring a network policy for a virtual port according to another embodiment of the present invention. The process includes the following steps:

S901. The network management center creates a network policy group in the local database.

This embodiment is different from the embodiment shown in FIG. 3A and FIG. 3B in that: in this embodiment, in the network policy group table formed by network policy groups, each network policy group includes a virtual network policy group (for example, VLAN and bandwidth limit information) and a physical network policy group (for example, port isolation and DHCP Snooping information). The network policy group table is as shown in Table 3.

S902. The server management center creates a VM on the server.

S903. The server management center obtains the MAC address of the virtual port of the new VM from the server.

S904. The server management center requests the virtual network policy group of the virtual port of the VM from the network management center.

The request that the server management center sends to the network management center carries the MAC address of the virtual port of the new VM.

S905. The network management center allocates a network policy group to the virtual port of the VM.

In addition, the network management center establishes a mapping locally by using the MAC address of the virtual port of the VM as the index, and associates the MAC address of the virtual port of the VM and the network policy group of the virtual port of the VM to form a virtual port policy association table as shown in Table 5.

S906. The network management center returns the virtual network policy group (for example, the VLAN and bandwidth limit information) of the virtual port of the VM to the server management center.

S907. The server management center delivers the virtual network policy group of the virtual port of the new VM to the virtual switch on the server.

The server management center may use the MAC address of the virtual port or the VM ID to indicate which virtual port or VM corresponds to the delivered virtual network policy group. In some cases, for example, in the case that the server management center creates another VM only after configuring the network policy for a VM, the MAC address of the virtual port or the VM ID may be omitted because at most one VM without the network policy exists on the server.

After receiving the virtual network policy group, the virtual switch may complete the network policy configuration for the virtual port of the VM.

S908. The physical switch receives packets (for example, ARP packets or DHCP packets) from the server, and learns the MAC address of the virtual port of the new VM.

S909. The physical switch sends a request for obtaining the network policy group (including the physical network policy group and the virtual network policy group) to the network management center.

The request sent by the physical switch carries the MAC address of the virtual port of the new VM.

S910. The network management center searches the virtual port policy association table by using the MAC address of the virtual port of the VM as the index.

S911. The network management center delivers the found network policy group (including the physical network policy group and the virtual network policy group) corresponding to the virtual port of the VM to the physical switch.

S912. After obtaining the physical network policy group and the virtual network policy group, the physical switch completes the network policy configuration for the virtual port of the VM.

When the network management center delivers the physical network policy group to the physical switch, the physical network policy group may carry the MAC address of the virtual port of the VM. The physical switch configures the network policy for the virtual port corresponding to the MAC address.

Figure 5A:
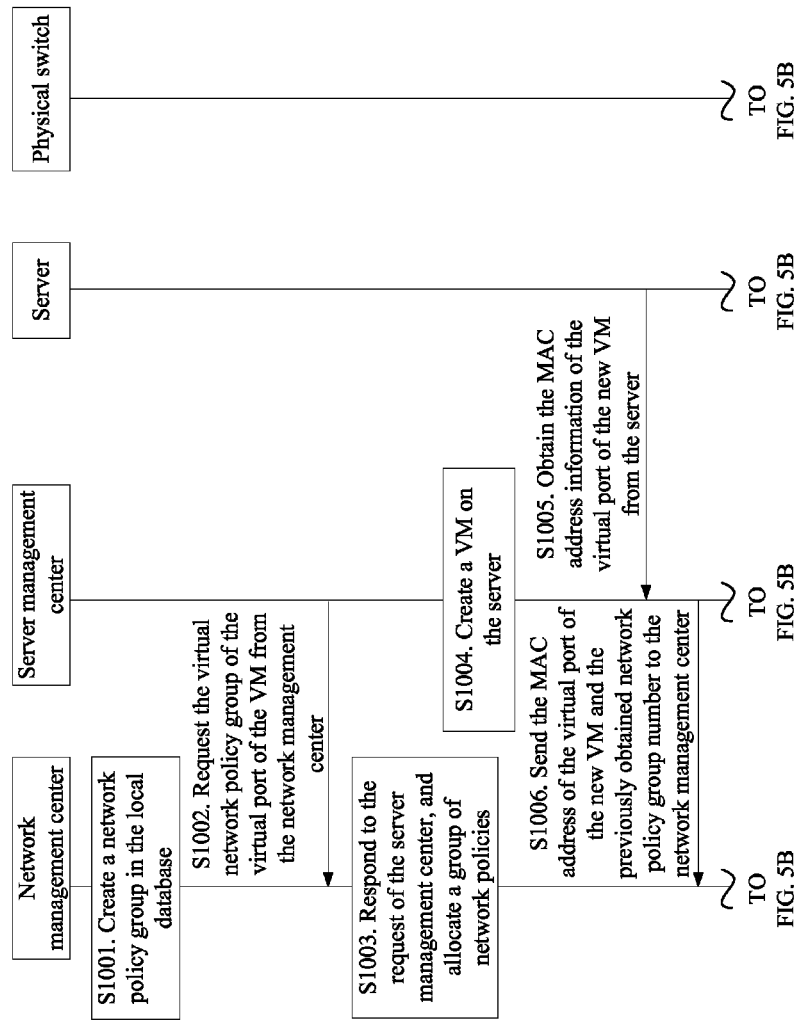
FIG. 5A and FIG. 5B are a schematic flowchart of interaction between a server management center, a server, a physical switch, and a network management center in the method for configuring a network policy for a virtual port according to another embodiment of the present invention.
Figure 5B:
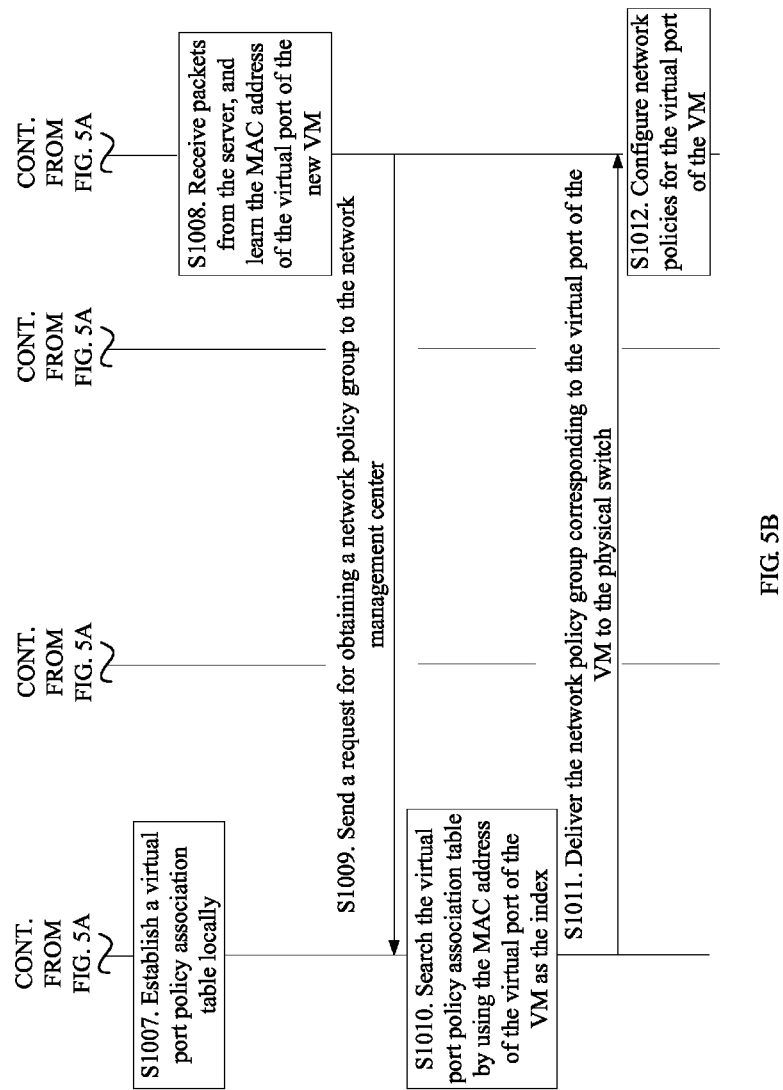

FIG. 5A and FIG. 5B are a schematic flowchart of interaction between the server management center, the server, the physical switch, and the network management center in the method for configuring a network policy for a virtual port according to another embodiment of the present invention.

The process includes the following steps:

S1001. The network management center creates a network policy group in the local database.

This embodiment is similar to the embodiment shown in FIG. 4A and FIG. 4B in that: in this embodiment, in the network policy group table formed by network policy groups, each network policy group includes a virtual network policy group (for example, VLAN and bandwidth limit information) and a physical network policy group (for example, port isolation and DHCP Snooping information). The network policy group table is as shown in Table 3.

S1002. The server management center requests the virtual network policy group of the virtual port of the VM from the network management center.

S1003. The network management center responds to the request of the network management center, and allocates a group of the network policy.

The network management center returns a virtual network policy group (for example, the VLAN and bandwidth limit information) of the virtual port corresponding to a new VM and the network policy group number of the virtual network policy group to the server management center.

S1004. The server management center creates a VM on the server.

In addition, the server management center delivers the virtual network policy group returned by the network management center to the virtual switch on the server, so that the virtual switch completes the network policy configuration for the virtual port corresponding to the new VM.

S1005. The server management center obtains the MAC address of the virtual port of the new VM from the server.

S1006. The server management center sends the MAC address of the virtual port of the new VM and the previously obtained network policy group number to the network management center.

S1007. The network management center establishes a mapping locally by using the MAC address of the virtual port of the new VM as the index, and associates the MAC address of the virtual port of the VM and the network policy group of the virtual port of the VM to form a virtual port policy association table as shown in Table 5.

S1008. The physical switch receives packets (for example, ARP packets or DHCP packets) from the server, and learns the MAC address of the virtual port of the new VM.

S1009. The physical switch sends a request for obtaining the network policy group (including the physical network policy group and the virtual network policy group) to the network management center.

The request sent by the physical switch carries the MAC address of the virtual port of the new VM.

S1010. The network management center searches the virtual port policy association table by using the MAC address of the virtual port of the VM as the index.

S1011. The network management center delivers the found network policy group (including the physical network policy group and the virtual network policy group) corresponding to the virtual port of the VM to the physical switch.

S1012. After obtaining the physical network policy group and the virtual network policy group, the physical switch completes the network policy configuration for the virtual port of the VM.

Compared with the interaction process shown in FIG. 5A and FIG. 5B, in the interaction process shown in FIG. 4A and FIG. 4B, the complexity of the interaction between the server management center and the network management center is reduced. In the interaction process shown in FIG. 5A and FIG. 5B, the complexity of the interaction between the server management center and the server is reduced.

Figure 6:
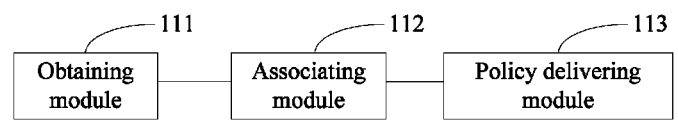
FIG. 6 is a schematic diagram illustrating a logical structure of a network management center according to an embodiment of the present invention.

FIG. 6 is a schematic diagram illustrating a logical structure of a network management center according to an embodiment of the present invention. For better description, only the modules related to the embodiment of the present invention are illustrated. The network management center includes an obtaining module 111, an associating module 112, and a policy delivering module 113.

The obtaining module 111 is configured to obtain a virtual network policy group, a physical network policy group, and the MAC address of a virtual port.

After the virtual network policy group is delivered to a virtual switch, the virtual network policy group it is used to configure a network policy for the virtual port.

The associating module 112 is configured to associate the virtual network policy group, the physical network policy group, and the MAC address of the virtual port to form a virtual port policy association table.

The policy delivering module 113 is configured to select a physical network policy group corresponding to the MAC address from the virtual port policy association table, and deliver the physical network policy group to a physical switch, so that the physical switch configures the network policy for the virtual port corresponding to the MAC address.

Figure 7:
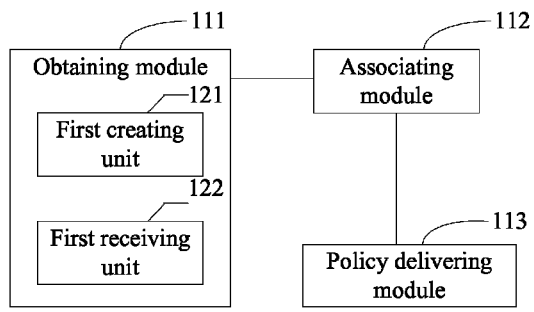
FIG. 7 is a schematic diagram illustrating a logical structure of a network management center according to another embodiment of the present invention.

The obtaining module 111 further includes a first creating unit 121 and a first receiving unit 122, as shown in FIG. 7.

The first creating unit 121 is configured to create the physical network policy group in a local database.

The first receiving unit 122 is configured to receive the MAC address of the virtual port and a mapping between the MAC address and the virtual network policy group, where the MAC address and the mapping are synchronized from the server management center, and obtain the virtual network policy group and the MAC address of the virtual port.

Figure 8:
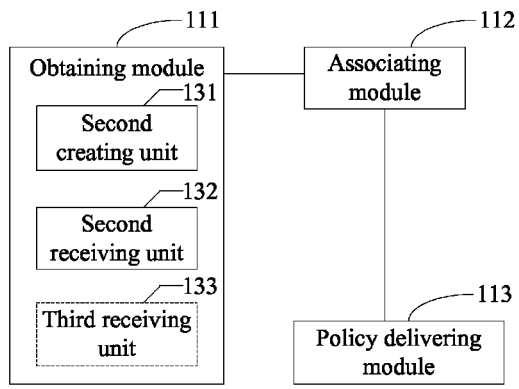
FIG. 8 is a schematic diagram illustrating a logical structure of a network management center according to another embodiment of the present invention.

In the network management center provided in another embodiment of the present invention, the obtaining module 111 further includes a second creating unit 131 and a second receiving unit 132, as shown in FIG. 8.

The second creating unit 131 is configured to create a network policy group composed of the virtual network policy group and the physical network policy group in the local database.

The second receiving unit 132 is configured to receive the MAC address of the virtual port of the VM from the server management center, and obtain the MAC address of the virtual port.

The second receiving unit 132 is further configured to receive a network policy group number corresponding to the MAC address from the server management center.

Or, the obtaining module 111 further includes a third receiving unit 133 configured to receive the network policy group number corresponding to the MAC address from the server management center.

Figure 9:
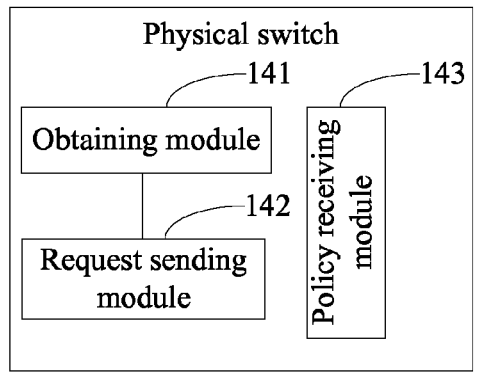
FIG. 9 is a schematic diagram illustrating a logical structure of a physical switch according to an embodiment of the present invention.

FIG. 9 is a schematic diagram illustrating a logical structure of a physical switch according to an embodiment of the present invention. For better description, only the modules related to the embodiment of the present invention are illustrated. The physical switch includes an obtaining module 141, a request sending module 142, and a policy receiving module 143.

The obtaining module 141 is configured to obtain the MAC address of a virtual port.

The request sending module 142 is configured to send a request that carries the MAC address, where the request is used to request delivering a physical network policy group that is used for configuring a network policy for the virtual port corresponding to the MAC address.

The policy receiving module 143 is configured to receive the physical network policy group, and configure the network policy for the virtual port corresponding to the MAC address.

The request is further used to request delivering a virtual network policy group that is used for configuring the network policy for the virtual port corresponding to the MAC address.

The policy receiving module 143 is further configured to receive the delivered virtual network policy group, and configure the network policy for the virtual port corresponding to the MAC address.

Figure 10:
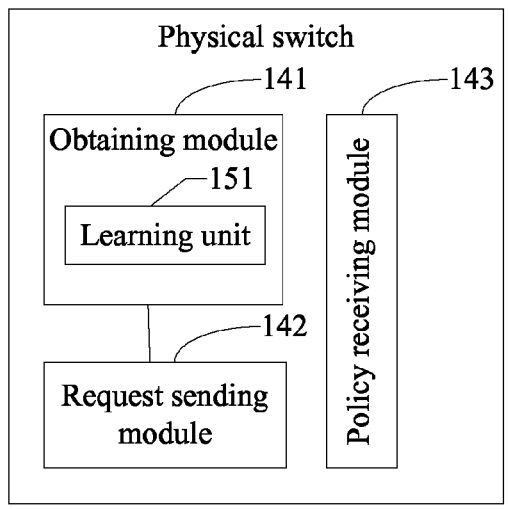
FIG. 10 is a schematic diagram illustrating a logical structure of a physical switch according to another embodiment of the present invention.

In the physical switch provided in another embodiment of the present invention, the obtaining module 141 includes a learning unit 51, as shown in FIG. 10. The learning unit 151 is configured to learn the MAC address of the virtual port by receiving packets from the server.

Figure 11:
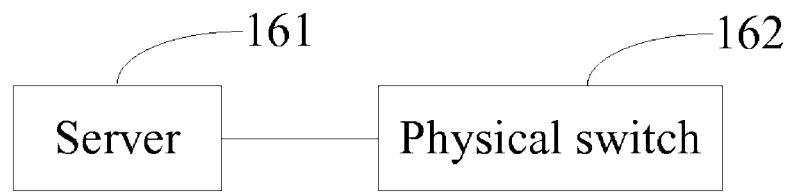
FIG. 11 is a schematic diagram illustrating a logical structure of a communication system according to an embodiment of the present invention.

FIG. 11 is a schematic diagram illustrating a logical structure of a communication system according to an embodiment of the present invention. For better description, only the modules related to the embodiment of the present invention are illustrated. The communication system includes a server 161 and the physical switch 162 shown in FIG. 9 or FIG. 10.

The server 161 is configured to create a VM, and send packets to the physical switch 162, where the packets carry the MAC address of a virtual port.

The physical switch 162 is configured to: obtain the MAC address of the virtual port from the packets sent by the server 161, send a request that carries the MAC address, receive the delivered virtual network policy group and physical network policy group, and configure the network policy for the virtual port corresponding to the MAC address.

In this embodiment, the request sent by the physical switch 162 is used to request delivering the virtual network policy group and the physical network policy group that are used for configuring the network policy for the virtual port corresponding to the MAC address.

Figure 12:
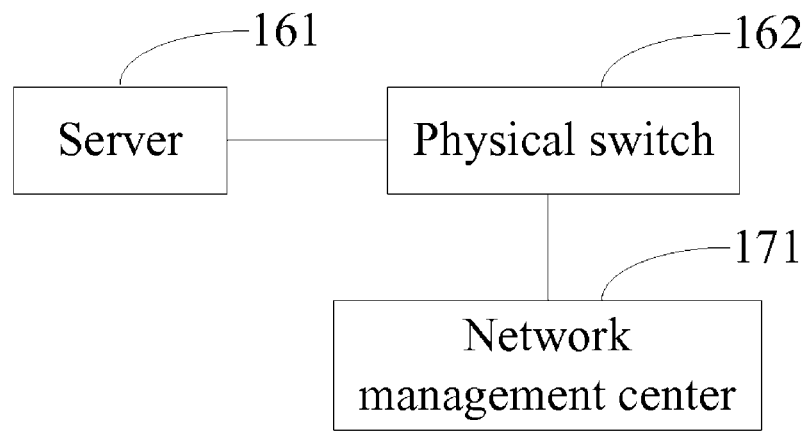
FIG. 12 is a schematic diagram illustrating a logical structure of a communication system according to another embodiment of the present invention.

The communication system provided in another embodiment further includes a network management center 171, as shown in FIG. 12. The network management center 171 is configured to: obtain a virtual network policy group, a physical network policy group, and the MAC address of a virtual port, associate the virtual network policy group, the physical network policy group, and the MAC address of the virtual port to form a virtual port policy association table, select a physical network policy group corresponding to the MAC address from the virtual port policy association table, and deliver the physical network policy group to the physical switch 162, so that the physical switch 162 configures the network policy for the virtual port corresponding to the MAC address.

Information interaction and execution processes between the modules or units of the apparatus are based on the idea of the method provided in embodiments of the present invention, and achieve the same technical effect as the method. For details, see the method embodiments of the present invention.

It is understandable to those skilled in the art that all or part of steps of the methods in embodiments of the present invention may be completed by related hardware instructed by a program. The program may be stored in a computer readable storage medium. The storage medium may include a read only memory (ROM), a random access memory (RAM), a magnetic disk, or a compact disk-read only memory (CD-ROM).

Detailed above are a method, a network management center, and a related device for configuring a network policy for a virtual port according to the embodiments of the present invention. Although the invention is described through some exemplary embodiments, these embodiments are only intended to help understand the method and the core idea of the present invention. Those skilled in the art can make various modifications and variations to the invention according to the idea of the present invention. The invention shall cover the modifications and variations provided that they fall within the scope of protection defined by the following claims or their equivalents.

What is claimed is:

1. A method for configuring a network policy for a virtual port, comprising:
    obtaining a physical network policy group and a media access control (MAC) address of a virtual port; wherein the virtual port is an interface between a virtual switch and a virtual machine for connecting the virtual switch and the virtual machine; the physical network policy group is a group of network policy configuration information that a physical switch uses for the virtual port;
    associating the physical network policy group and the MAC address of the virtual port to form a virtual port policy association table; and
    receiving, from a physical switch, a request for obtaining the network policy, wherein the request carries the MAC address of the virtual port;
    selecting the physical network policy group corresponding to the MAC address carried by the request from the virtual port policy association table, and delivering the physical network policy group to the physical switch sending the request, so that the physical switch sending the request configures, according to the delivered physical network policy group, the network policy for the virtual port corresponding to the MAC address carried by the request.

2. The method of claim 1, wherein
    the step of obtaining comprises:
    obtaining a virtual network policy group, the physical network policy group, and the MAC address of the virtual port, wherein the virtual network policy group is a group of network policy configuration information that the virtual switch uses for the virtual port;
    the step of associating comprises:
    associating the virtual network policy group, the physical network policy group, and the MAC address of the virtual port to form the virtual port policy association table.

3. The method of claim 2, wherein:
    the step of obtaining the physical network policy group comprises: creating the physical network policy group in a local database; and
    the step of obtaining the virtual network policy group and the MAC address of the virtual port comprises: obtaining the virtual network policy group and the MAC address of the virtual port by receiving the MAC address of the virtual port and a mapping between the MAC address of the virtual port and the virtual network policy group.

4. The method of claim 3, wherein the method further comprises:

selecting a virtual network policy group corresponding to the MAC address from the virtual port policy association table, and delivering the virtual network policy group to the physical switch.

5. The method of claim 2, wherein:
the step of obtaining the virtual network policy group and the physical network policy group comprises: creating a network policy group composed of the virtual network policy group and the physical network policy group in a local database; and
the step of obtaining the MAC address of the virtual port comprises: obtaining the MAC address of the virtual port by receiving the MAC address of the virtual port sent by a server management center.

6. The method of claim 5, wherein when or after the receiving the MAC address of the virtual port sent by the server management center, the method further comprises:
receiving a network policy group number corresponding to the MAC address sent by the server management center.

7. The method of claim 5, wherein the method further comprises:
delivering the virtual network policy group to the physical switch.

8. The method of claim 2, wherein the method further comprises:
selecting a virtual network policy group corresponding to the MAC address from the virtual port policy association table, and delivering the virtual network policy group to the physical switch.

9. A method for configuring a network policy for a virtual port, comprising:
Obtaining, by a physical switch, a media access control (MAC) address of a virtual port, wherein the virtual port is an interface between a virtual switch and a virtual machine for connecting the virtual switch and the virtual machine;
sending, by the physical switch, a request that carries the MAC address to a network management center, wherein the request is used to request the network management center to deliver a physical network policy group that is used for configuring the network policy for the virtual port corresponding to the MAC address; and
receiving, by the physical switch, the delivered physical network policy group, and configuring, according to the delivered physical network policy group, the network policy for the virtual port corresponding to the MAC address.

10. The method of claim 9, wherein the step of obtaining the MAC address of the virtual port comprises:
learning the MAC address of the virtual port by receiving packets from a server.

11. The method of claim 9, wherein:
the request is further used to request delivering a virtual network policy group, wherein the virtual network policy group is a group of network policy configuration information that the virtual switch uses for the virtual port; and
when or after receiving the delivered physical network policy group, the method further comprises:
receiving, by the physical switch, the virtual network policy group, and configuring, according to the virtual network policy group, the network policy for the virtual port corresponding to the MAC address.

12. A network management center, comprising:
an obtaining module, configured to obtain a physical network policy group and a media access control (MAC) address of a virtual port; wherein the virtual port is an interface between a virtual switch and a virtual machine for connecting the virtual switch and the virtual machine; the physical network policy group is a group of network policy configuration information that a physical switch uses for the virtual port;
an associating module, configured to associate the physical network policy group and the MAC address of the virtual port to form a virtual port policy association table;
a receiver, configured to receive, from a physical switch, a request for obtaining the network policy, wherein the request carries the MAC address of the virtual port; and
a policy delivering module, configured to select the physical network policy group corresponding to the MAC address carried by the request from the virtual port policy association table, and deliver the physical network policy group to the physical switch sending the request.

13. The method of claim 12, wherein
the obtaining module configured to obtain a virtual network policy group, the physical network policy group, and the MAC address of the virtual port, wherein the virtual network policy group is a group of network policy configuration information that the virtual switch uses for the virtual port;
the associating module configured to associate the virtual network policy group, the physical network policy group, and the MAC address of the virtual port to form the virtual port policy association table.

14. The network management center of claim 13, wherein the obtaining module comprises a creating unit and a receiving unit, wherein:
the creating unit is configured to create the physical network policy group in a local database; and
the receiving unit is configured to obtain the virtual network policy group and the MAC address of the virtual port by receiving the MAC address of the virtual port and a mapping between the MAC address of the virtual port and the virtual network policy group.

15. The network management center of claim 14, wherein the policy delivering module, further configured to select a virtual network policy group corresponding to the MAC address from the virtual port policy association table, and deliver the virtual network policy group to the physical switch.

16. The network management center of claim 13, wherein the obtaining module comprises a creating unit and a receiving unit, wherein:
the creating unit is configured to create a network policy group composed of the virtual network policy group and the physical network policy group in a local database; and
the receiving unit is configured to obtain the MAC address of the virtual port by receiving the MAC address of the virtual port from a server management center.

17. The network management center of claim 16, wherein:
the receiving unit is further configured to receive a network policy group number corresponding to the MAC address of the virtual port from the server management center.

18. The network management center of claim 16, wherein the policy delivering module, further configured to deliver the virtual network policy group to the physical switch.

19. The network management center of claim 13, wherein the policy delivering module, further configured to select a virtual network policy group corresponding to the MAC address from the virtual port policy association table, and deliver the virtual network policy group to the physical switch.

20. A physical switch, comprising:
- an obtaining module, configured to obtain a media access control (MAC) address of a virtual port, wherein the virtual port is an interface between a virtual switch and a virtual machine for connecting the virtual switch and the virtual machine;
- a request sending module, configured to send a request that carries the MAC address to a network management center, wherein the request is used to request the network management center to deliver a physical network policy group that is used for configuring a network policy for the virtual port corresponding to the MAC address; and
- a policy receiving module, configured to receive the delivered physical network policy group, and configure, according to the delivered physical network policy group, the network policy for the virtual port corresponding to the MAC address.

21. The physical switch of claim 20, wherein:
- the obtaining module comprises a learning unit configured to learn the MAC address of the virtual port by receiving packets from a server.

22. The physical switch of claim 20, wherein:
- the request is further used to request delivering a virtual network policy group that is used for configuring the network policy for the virtual port corresponding to the MAC address, wherein the virtual network policy group is a group of network policy configuration information that the virtual switch uses for the virtual port; and
- the policy receiving module is further configured to receive the delivered virtual network policy group, and configure, according to the virtual network policy group, the network policy for the virtual port corresponding to the MAC address.

* * * * *